United States Patent
He

(10) Patent No.: US 12,528,274 B2
(45) Date of Patent: Jan. 20, 2026

(54) TEMPERED GLASS FOR PREVENTING GENERATION OF RAINBOW PATTERN AND MANUFACTURING METHOD THEREOF

(71) Applicant: DongGuan JEX Industrial Co., Ltd, DongGuan (CN)

(72) Inventor: Wei He, Shenzhen (CN)

(73) Assignee: DONGGUAN JEX INDUSTRIAL CO., LTD, Dongguan (CN)

( * ) Notice: Subject to any disclaimer, the term of this patent is extended or adjusted under 35 U.S.C. 154(b) by 53 days.

(21) Appl. No.: 18/595,472

(22) Filed: Mar. 5, 2024

(65) Prior Publication Data

US 2025/0282124 A1 Sep. 11, 2025

(51) Int. Cl.
| | | |
|---|---|---|
| *B32B 27/08* | (2006.01) | |
| *B29C 48/00* | (2019.01) | |
| *B29C 48/07* | (2019.01) | |
| *B29C 48/21* | (2019.01) | |
| *B29C 48/91* | (2019.01) | |
| *B32B 5/18* | (2006.01) | |
| *B32B 7/06* | (2019.01) | |
| *B32B 7/12* | (2006.01) | |
| *B32B 27/06* | (2006.01) | |
| *B29L 31/34* | (2006.01) | |

(52) U.S. Cl.
CPC .......... *B32B 27/08* (2013.01); *B29C 48/0018* (2019.02); *B29C 48/0021* (2019.02); *B29C 48/022* (2019.02); *B29C 48/07* (2019.02); *B29C 48/21* (2019.02); *B29C 48/91* (2019.02); *B32B 5/18* (2013.01); *B32B 7/06* (2013.01); *B32B 7/12* (2013.01); *B32B 27/065* (2013.01); *B29L 2031/3475* (2013.01); *B32B 2266/057* (2016.11); *B32B 2266/12* (2016.11); *B32B 2307/7376* (2023.05); *B32B 2307/748* (2013.01); *B32B 2571/00* (2013.01)

(58) Field of Classification Search
CPC .. B32B 27/08; B32B 5/18; B32B 7/06; B32B 7/12; B32B 27/065; B29C 48/022; B29C 48/07; B29C 48/21; B29C 48/0018; B29C 48/91; B29C 48/0021
USPC .......................................................... 264/173
See application file for complete search history.

(56) References Cited

U.S. PATENT DOCUMENTS

| | | | | |
|---|---|---|---|---|
| 2005/0096431 | A1* | 5/2005 | Fujii | .................... C08L 23/22 525/178 |
| 2009/0286098 | A1* | 11/2009 | Yajima | ................... C08J 7/046 264/1.6 |

* cited by examiner

Primary Examiner — Yung-Sheng M Tsui
(74) Attorney, Agent, or Firm — Bayramoglu Law Offices LLC

(57) ABSTRACT

A tempered glass for preventing generation of a rainbow pattern and a manufacturing method thereof are provided. The tempered glass for preventing generation of the rainbow pattern is prepared by compounding a protective layer and an ultra-low phase-difference substrate layer. A compounding process is introduced in the manufacturing method to allow the synchronous stretching of a plurality of layers. In the tempered glass, a substrate layer with an ultra-low phase difference in terms of a polarization angle from a polarizer is arranged, such that a user can well view a screen of an electronic product in various scenarios, and a content of a screen will not undergo rainbow patterns or color differences due to different scenarios and conditions. A material used for the tempered glass has a high light transmittance, a low haze, a high deformation rate, and a high resilience rate to allow ultra-high performance.

7 Claims, 1 Drawing Sheet

TEMPERED GLASS FOR PREVENTING GENERATION OF RAINBOW PATTERN AND MANUFACTURING METHOD THEREOF

TECHNICAL FIELD

The present disclosure relates to a tempered glass, and in particular to a tempered glass for preventing generation of a rainbow pattern, and a manufacturing method thereof.

BACKGROUND

A screen-protection film is a product for protecting a screen or a surface of an electronic product. When electronic products with the existing screen-protection films are used by polarized sunglass wearers, a large number of rainbow patterns are generated on screens of the electronic products. For example, when a user wearing sunglasses or night-vision goggles (NVGs) drives, a large number of rainbow patterns are generated on a mobile phone screen with a protective film or on a car's central control screen with a protective film during navigation. The generation of the rainbow patterns will affect a content that the user can view, and a dazzling effect of the rainbow patterns will cause damage to eyes of the user to cause rapid visual fatigue. When a user wearing sunglasses is on vacation outdoors, or works outdoors and uses a mobile phone, a tablet computer, or a computer with a screen-protection film, a large number of rainbow patterns are generated on a screen of the mobile phone, the tablet computer, or the computer, which makes the user fail to clearly view a content of the screen and also causes rapid visual fatigue.

Screen-protection films have been used for various electronic screens. It is necessary to consider that a screen-protection film should not affect the user experience of a product under various use conditions or various environmental factors while protecting a screen of the product. However, the existing screen-protection films incapable of preventing generation of rainbow patterns are not suitable for users who wear polarized sunglasses.

Therefore, it is necessary to improve the current screen-protection films. The present disclosure provides a tempered glass for preventing generation of a rainbow pattern as a screen-protection film, and a manufacturing method thereof.

SUMMARY

The objective of the present disclosure can be allowed by the following technical solutions: A manufacturing method of a tempered glass for preventing generation of a rainbow pattern is provided, including the following steps:
a. casting: subjecting a tempered glass layer A and an ultra-low phase-difference substrate layer B to double-layer co-extrusion to obtain a precursor film, wherein an extrusion thickness ratio of the tempered glass layer A to the ultra-low phase-difference substrate layer B is 80:10 to 60:20;
b. heat treatment: subjecting the precursor film obtained in the step a to the heat treatment at 130° C. to 170° C. for 5 h to 8 h to obtain a heat-treated film;
c. compounding: subjecting the heat-treated film obtained in the step b to the compounding at a compounding temperature of 60° C. to 80° C.; and
d. stretching: stretching the composite heat-treated film obtained in the step c at a stretching temperature of 120° C. to 155° C. and a stretching ratio of 1 to 3 to obtain a double-layer composite film.

Further, the tempered glass layer A is made of a hardened polyethylene terephthalate (PET) or hardened polycarbonate (PC) or hardened polymethyl methacrylate (PMMA) material, and the tempered glass layer A has a thickness of 100 μm to 500 μm and a hardness of 6 H to 7 H.

Further, the ultra-low phase-difference substrate layer B is made of a super retardation film (SRF) or PC or PMMA or cyclo-olefin polymer (COP) material, and the ultra-low phase-difference substrate layer B has a thickness of 15 μm to 250 μm.

Further, in the step a, the extrusion thickness ratio of the tempered glass layer A to the ultra-low phase-difference substrate layer B is preferably 70:15 to 60:20, where the tempered glass layer A and the ultra-low phase-difference substrate layer B are combined to form an A-B double-layer structure.

In the step b, the heat treatment is preferably conducted at a heat treatment temperature of 155° C. to 165° C. for 5 h to 6 h.

In the step c, 2 to 6 layers are preferably compounded, and the compounding temperature is preferably 60° C. to 80° C.

In the step d, 2 to 24 layers are preferably stretched, the stretching temperature is preferably 140° C. to 150° C., and the stretching ratio is 1.5 to 2.

As a further embodiment of the present disclosure, a tempered glass for preventing generation of a rainbow pattern is provided, including a double-layer composite film, a silica gel layer, and a peelable release layer, where the silica gel layer is fixedly attached to a lower surface of the double-layer composite film, and the peelable release layer is attached to a lower surface of the silica gel layer.

Further, the tempered glass layer has a thickness of 100 μm to 700 μm.

Further, the OCA layer has a thickness of 50 μm to 300 μm and a viscosity of 50 g to 5,000 g.

Further, the silica gel layer has a thickness of 25 μm to 100 μm and a viscosity of 1 g to 600 g.

Further, the release layer is made of a PET or PC or PMMA material, and has a thickness of 25 μm to 800 μm.

The tempered glass for preventing generation of a rainbow pattern is prepared by compounding a protective layer and an ultra-low phase-difference substrate layer. A compounding process is introduced in the present disclosure to allow the synchronous stretching of a plurality of layers, which can greatly improve the production efficiency and the performance consistency of compounded layers. In addition, the present disclosure avoids the use of an OCA layer for bonding, which affects an optical effect and is prone to edge lifting.

In the present disclosure, an ultra-low phase-difference substrate layer is arranged, such that a user can well view a screen of an electronic product in various scenarios, and a content of a screen will not undergo rainbow patterns or color differences due to different scenarios and conditions. A material used for the product of the present disclosure has a high light transmittance, a low haze, a high deformation rate, and a high resilience rate to allow ultra-high performance. The product of the present disclosure has a total light transmittance of higher than or equal to 93%, a haze of lower than or equal to 0.5%, blue light reduced by 27%, and a dielectric constant of less than 2.5. The product of the present disclosure also has excellent high-temperature and low-temperature resistance, and the product of the present disclosure can maintain its original characteristics at a high temperature of 100° C. and a low temperature of −30° C.

The tempered glass of the present disclosure has a strong edge adhesion ability, is not prone to edge lifting, and also has advantages such as high light transmittance, high touch sensitivity, high hardness, strong scratch resistance, and strong impact resistance.

DETAILED DESCRIPTION OF THE EMBODIMENTS

The present disclosure is further described below with reference to accompanying drawings and examples.

Example 1 a. Casting: A tempered glass layer A and an ultra-low phase-difference substrate layer B were subjected to double-layer co-extrusion to obtain a precursor film, where an extrusion thickness ratio of the tempered glass layer A to the ultra-low phase- difference substrate layer B was 80:10.

b. Heat treatment: The precursor film obtained in the step a was subjected to the heat treatment at 140° C. for 4 h to obtain a heat-treated film.

c. Compounding: The heat-treated film obtained in the step b was subjected to the compounding at a compounding temperature of 70° C.

d. Stretching: The composite heat-treated film obtained in the step c was stretched at a stretching temperature of 140° C. and a stretching ratio of 2 to obtain a double-layer composite film.

The tempered glass layer A is made of a hardened PET or hardened PC or hardened PMMA material, and the tempered glass layer A has a thickness of 80 μm and a hardness of 6 H to 7 H.

Further, the ultra-low phase-difference substrate layer B is made of an SRF or PC or PMMA or COP material, and the ultra-low phase-difference substrate layer B has a thickness of 10 μm.

Example 2 a. Casting: A tempered glass layer A and an ultra-low phase-difference substrate layer B were subjected to double-layer co-extrusion to obtain a precursor film, where an extrusion thickness ratio of the tempered glass layer A to the ultra-low phase- difference substrate layer B was 60:20.

b. Heat treatment: The precursor film obtained in the step a was subjected to the heat treatment at 140° C. for 4 h to obtain a heat-treated film.

c. Compounding: The heat-treated film obtained in the step b was subjected to the compounding at a compounding temperature of 70° C.

d. Stretching: The composite heat-treated film obtained in the step c was stretched at a stretching temperature of 140° C. and a stretching ratio of 2 to obtain a double-layer composite film.

The tempered glass layer A is made of a hardened PET or hardened PC or hardened PMMA material, and the tempered glass layer A has a thickness of 60 μm and a hardness of 6 H to 7 H.

Further, the ultra-low phase-difference substrate layer B is made of an SRF or PC or PMMA or COP material, and the ultra-low phase-difference substrate layer B has a thickness of 20 μm.

Example 3

Figure 1:
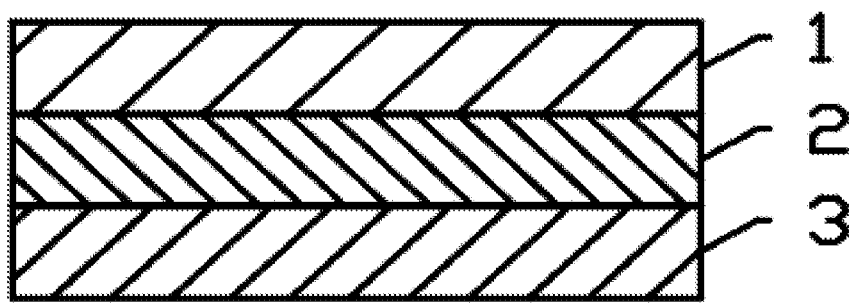
FIG. 1 is a structure diagram of a tempered glass for preventing generation of a rainbow pattern.

As shown in FIG. 1, a tempered glass for preventing generation of a rainbow pattern is provided, including double-layer composite film 1, silica gel layer 2, and peelable release layer 3, where the silica gel layer 2 is fixedly attached to a lower surface of the double-layer composite film 1, and the peelable release layer 3 is attached to a lower surface of the silica gel layer 2. The silica gel layer has a thickness of 50 μm and a viscosity of 60 g. The release layer is made of a PET or PC or PMMA material, and has a thickness of 80 μm.

Example 4

Figure 2:
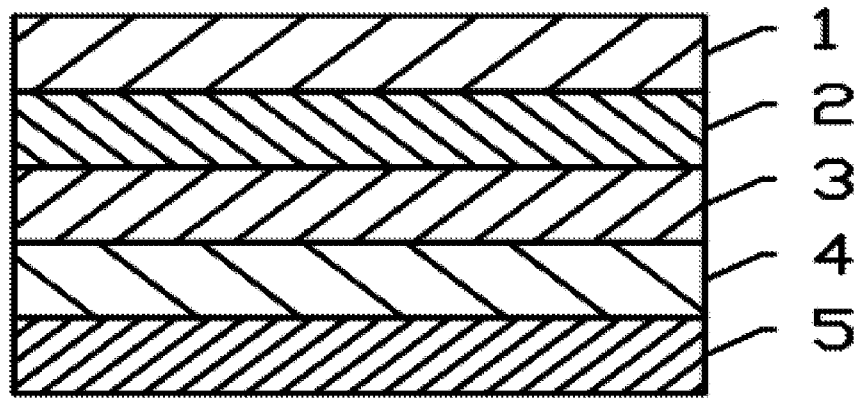
FIG. 2 is a structure diagram of a tempered glass film for preventing generation of a rainbow pattern.

As shown in FIG. 2, a tempered glass film for preventing generation of a rainbow pattern is provided, including tempered glass layer 1, OCA layer 2, double-layer composite film 3, silica gel layer 4, and peelable release layer 5, where the OCA layer 2 is attached to a lower surface of the tempered glass layer 1, the double-layer composite film 3 is attached to a lower surface of the OCA layer 2, the silica gel layer 4 is fixedly attached to a lower surface of the double-layer composite film 3, and the peelable release layer 5 is attached to a lower surface of the silica gel layer 4. The tempered glass layer has a thickness of 330 μm. The OCA layer has a thickness of 200 μm and a viscosity of 2,500 g. The silica gel layer has a thickness of 50 μm and a viscosity of 10 g. The release layer is made of a PET or PC or PMMA material, and has a thickness of 75 μm.

The above are merely preferred examples of the present disclosure, and are intended to further describe the present disclosure in detail in conjunction with specific preferred embodiments. It cannot be considered that the specific implementation of the present disclosure is limited to these examples. Any modifications, equivalent substitutions, improvements, or the like made within the spirit and principle of the present disclosure should be included within the protection scope of the present disclosure.

What is claimed is:

1. A manufacturing method of a tempered glass for preventing generation of a rainbow pattern, comprising the following steps:

a) casting: subjecting a tempered glass layer A and an ultra-low phase-difference substrate layer B to double-layer co-extrusion to obtain a precursor film, wherein an extrusion thickness ratio of the tempered glass layer A to the ultra-low phase-difference substrate layer B is 80:10 to 60:20, and wherein the tempered glass layer A is made of hardened polyethylene terephthalate (PET) or hardened polycarbonate (PC) or hardened polymethyl methacrylate (PMMA) material, and the ultra-low phase-difference substrate layer B is made of super retardation film (SRF) or PC or PMMA or cyclo-olefin polymer (COP) material;

b) heat treatment: subjecting the precursor film obtained in the step a to the heat treatment at 130° C. to 170° C. for 5 h to 8 h to obtain a heat-treated film;

c) layer compounding: subjecting the heat-treated film obtained in the step b to the layer compounding at a layer compounding temperature of 60° C. to 100° C. to obtain a composite heat-treated film; and d) stretching:

stretching the composite heat-treated film obtained in the step c at a stretching temperature of 120° C. to 155° C. and a stretching ratio of 1 to 3 to obtain a double-layer composite film.

2. The manufacturing method of the tempered glass for preventing generation of the rainbow pattern according to claim 1, wherein the tempered glass layer A has a thickness of 100 μm to 500 μm and a hardness of 6 H to 7 H.

3. The manufacturing method of the tempered glass for preventing generation of the rainbow pattern according to claim 2, wherein the ultra-low phase-difference substrate layer B has a thickness of 15 μm to 250 μm.

4. The manufacturing method of the tempered glass for preventing generation of the rainbow pattern according to claim 3, wherein in the step a, the extrusion thickness ratio of the tempered glass layer A to the ultra-low phase-difference substrate layer B is 70:15 to 60:20, wherein the tempered glass layer A and the ultra-low phase-difference substrate layer B are combined to form an A-B double-layer structure.

5. The manufacturing method of the tempered glass for preventing generation of the rainbow pattern according to claim 4, wherein in the step b, the heat treatment is conducted at a heat treatment temperature of 155° C. to 165° C. for 5 h to 6 h.

6. The manufacturing method of the tempered glass for preventing generation of the rainbow pattern according to claim 5, wherein in the step c, 2 to 6 layers are compounded, and the compounding temperature is 60° C. to 80° C.

7. The manufacturing method of the tempered glass for preventing generation of the rainbow pattern according to claim 6, wherein in the step d, 2 to 24 layers are stretched, the stretching temperature is 140° C. to 150° C., and the stretching ratio is 1.5 to 2.

* * * * *